3,295,641
WHEELS
Maurice B. Eaton and Clifford J. Parton, Tyseley, Birmingham, England, assignors to Girling Limited
Filed Mar. 1, 1966, Ser. No. 530,975
Claims priority, application Great Britain, Mar. 1, 1965, 8,698/65
5 Claims. (Cl. 188—218)

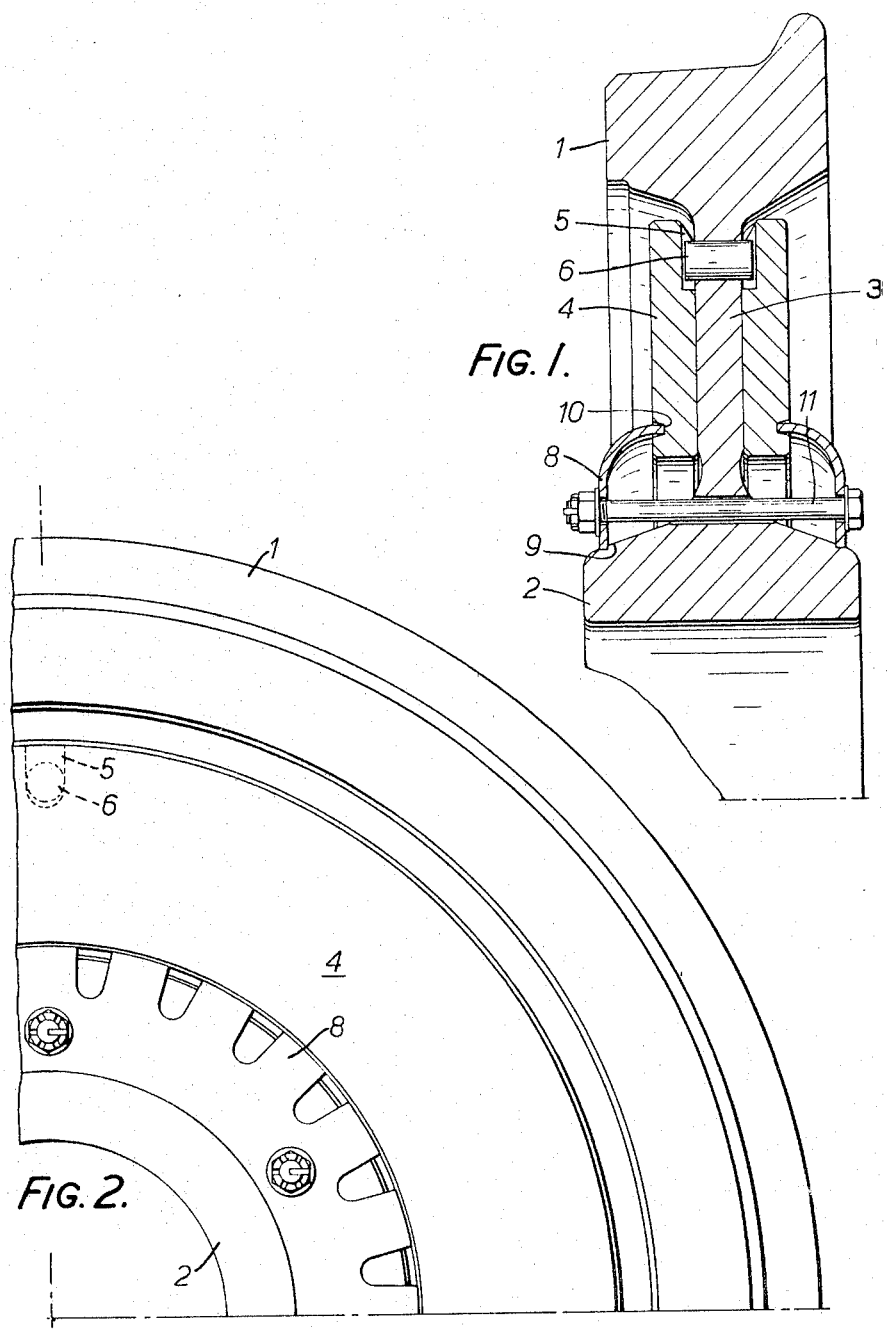

This invention relates to railway vehicle wheels and more particularly to a railway vehicle wheel having a braking surface.

It is an object of this invention to provide a braking surface on a wheel for engaging a railway line which is simple to mount and which has a robust interconnection between the surface and the wheel to transmit torque developed therebetween to the wheel structure and which will permit differential radial expansion between the disc and wheel.

It has been proposed to provide discs on both faces of a railway vehicle wheel bolted to the wheel by bolts engaging the discs where they abut the wheel and engaging the discs and wheel to form locks against angular movement of the discs relative to the wheel. The wheel and discs are therefore rigidly locked against relative radial movement at the bolted region and any torque appearing between the wheel and disc in excess of that which will be resisted by friction between the wheel and discs will be transmitted to the bolts.

According to the present invention there is provided a railway vehicle wheel for engaging a railway line comprising a flanged rim, a hub and means interconnecting the hub and rim, at least one disc having one face supported against movement axially of the wheel by the interconnecting means and the axially oppositely directed face carrying a braking surface, resilient retaining means extending radially from a margin of the disc, abutting a stop on the wheel and permitting some relative radial movement between the disc and wheel and clamping means engaging the resilient retaining means and a surface supported by the wheel to urge the resilient retaining means towards the wheel and thereby the disc against the interconnecting means, locking means being provided forming a mechanical connection between the wheel and disc permitting relative radial movement while preventing relative angular movement between the wheel and disc.

There may be a disc, with resilient retaining means, on each side of the wheel, in which case the clamp means may engage both retaining means. Alternatively, with only one disc, the clamp means engage the resilient means and the wheel. Preferably the clamp means in either case is adjustable to exert a predetermined load on the resilient retaining means.

The locking means to prevent the disc or each disc from moving about the wheel axis may be in the form of a dowel in the wheel engaging a radially directed groove in the disc or each disc.

In order that the present invention may be well understood there will now be described two embodiments thereof, given by way of example only, reference being had to the accompanying drawings in which:

FIGURE 1 is an axial section through a railway vehicle wheel,

FIGURE 2 is a front elevation of the wheel of FIGURE 1, and

Figure 3:
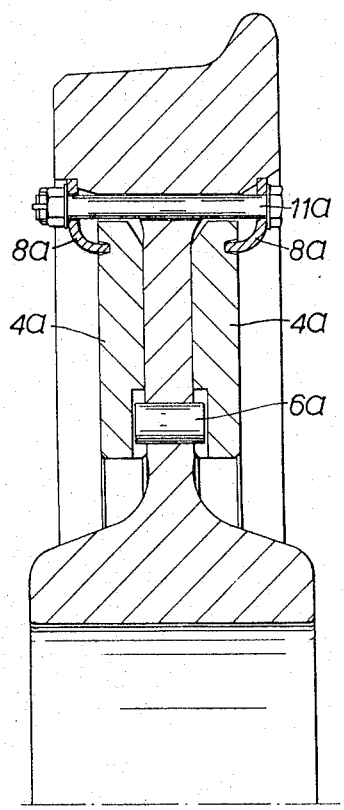
FIGURE 3 is an axial section through a second embodiment.

Referring to FIGURES 1 and 2, the wheel shown is a disc wheel and comprises a rim 1, a hub 2 and solid intermediate part 3. Each face of the part 3 axially supports an annular disc 4 having a radial groove 5 engaged by a dowel 6 extending through the part 3. The radially inner margin of each disc is engaged by the greater periphery of a resilient concave annular bell 8 the lesser periphery of which engages a shoulder 9 on the hub.

The greater periphery of each bell is interrupted and in this embodiment the periphery is scalloped as shown in FIGURE 2. This periphery engages a groove 10 in the associated disc.

Through the bells and the wheel extend a number of equispaced bolts 11 which are tightened to a predetermined torque to apply a predetermined load to the bells.

The two bells, while allowing expansion radially outwardly of the discs, also centralise the discs radially, and so keep the balance of the wheel within acceptable bounds. The bells allow the discs to expand and contract independently and expansion of either one disc does not remove all of the pre load on the other. The scallop form of the bells relieves hoop stresses in the bells and provides a predetermined centralising force which is insufficient to overstress the inner margins of the discs.

The bells also allow the discs to shrink below their nominal, new diameter over a long period (of the order of years). This shrinkage can be caused by heating and is known as heat shrinkage.

Drive from the wheels to the discs may occur through the dowel pin but this is likely in practice to be only intermittent, since friction between the discs and the wheel determined by the pre-load and also when the brakes are applied by the brake clamping forces will usually be sufficient to transmit drive.

Referring to FIGURE 3 the construction is similar in all respects to that of FIGURES 1 and 2 except that the discs 4a are locked against angular movement relative to the wheel by dowel 6a at the radially inner region of the discs and wheel and at their outer peripheries by bells 8a urged toward one another by bolts 11a. Again the periphery of each bell engaging a disc is scalloped.

We claim:

1. A vehicle wheel for engaging a railway line comprising a flanged rim, a hub and means interconnecting the hub and rim, at least one disc having one face supported against movement axially of the wheel by the interconnecting means and the axially oppositely directed face carrying a braking surface, resilient retaining means extending radially from a margin of the disc, abutting a stop on the wheel and permitting some relative radial movement between the disc and wheel and clamping means engaging the resilient retaining means and a surface supported by the wheel to urge the resilient retaining means toward the wheel and thereby the disc against the interconnecting means, locking means being provided forming a mechanical connection between the wheel and disc permitting relative radial movement while preventing relative angular movement between the wheel and disc.

2. A vehicle wheel according to claim 1 in which the locking means for the wheel and disc comprise a dowel fast with one and engaging in a radial recess in the other.

3. A vehicle wheel according to claim 1 in which the resilient retaining means comprise an element extending from the disc, abutting a surface on the wheel and in a region therebetween being spaced from the wheel, bolts extending through the region and engagaing means provided on the wheel to urge the disc through the resilient means towards the interconnecting means.

4. A vehicle wheel according to claim 1 in which an annular disc is supported by each of the opposite faces of the interconnecting means, a resilient retaining element extending from each disc, engaging a surface on the wheel and in a region therebetween being spaced from the wheel, bolts each extending through one element in said region, the wheel and through the other element in said region and urging the elements toward one another and the discs toward the interconnecting means.

5. A vehicle wheel according to claim 1 in which the retaining means comprise an element being a separate entity from the disc and engaging the disc by an axially directed interrupted margin.

References Cited by the Examiner
UNITED STATES PATENTS 1,179,239   10/1964   Moller _____ 188—218

OTHER REFERENCES

German printed application 2,214,762, September 1940.

MILTON BUCHLER, *Primary Examiner.*

B. S. MOWRY, *Assistant Examiner.*